United States Patent [19]

Reusser

[11] 4,292,279
[45] Sep. 29, 1981

[54] PRODUCTION OF HIGH PURITY URANIUM COMPOUNDS FROM CRUDE YELLOW CAKE

[75] Inventor: Robert E. Reusser, Bartlesville, Okla.

[73] Assignee: Phillips Petroleum Co., Bartlesville, Okla.

[21] Appl. No.: 31,655

[22] Filed: Apr. 19, 1979

[51] Int. Cl.$^3$ .............................................. C01G 43/00
[52] U.S. Cl. ...................................... 423/15; 423/18; 423/260
[58] Field of Search ................... 423/8, 10, 15, 18, 260

[56] References Cited

U.S. PATENT DOCUMENTS

| | | | |
|---|---|---|---|
| 2,800,387 | 7/1957 | Kimball et al. | 423/8 |
| 2,953,432 | 9/1960 | Hart et al. | 423/8 |
| 2,982,602 | 5/1961 | Sherk et al. | 423/15 |
| 3,034,856 | 5/1962 | Reusser | 423/18 |
| 3,100,681 | 8/1963 | Townend et al. | 423/18 |
| 3,174,821 | 3/1965 | Opratko et al. | 423/15 |
| 3,740,200 | 6/1973 | Gautier | 423/18 |
| 3,790,658 | 2/1974 | Fox et al. | 423/18 |
| 3,880,980 | 4/1975 | Wamser | 423/18 |
| 3,920,788 | 11/1975 | Mercier et al. | 423/18 |
| 3,963,828 | 6/1976 | Becker | 423/261 |
| 4,180,545 | 12/1979 | McCullough et al. | 423/15 |

*Primary Examiner*—Edward A. Miller

[57] ABSTRACT

High purity ammonium uranyl tricarbonate is produced from crude plant yellow cake by treatment of the yellow cake with a mineral acid, neutralization of the acidic solution with a conversion of the uranium therein to ammonium uranyl tricarbonate, precipitation of the ammonium uranyl tricarbonate with a non-solvent, followed by separation. Optionally, the ammonium uranyl tricarbonate can be calcined to produce high purity uranium oxides.

8 Claims, No Drawings

PRODUCTION OF HIGH PURITY URANIUM COMPOUNDS FROM CRUDE YELLOW CAKE

FIELD OF THE INVENTION

The invention pertains to the conversion of crude yellow cake to products of high purity. In another aspect, the invention pertains to the conversion of crude yellow cake to highly pure ammonium uranyl tricarbonate. In still another aspect, the invention pertains to the production of high purity uranium oxides from crude plant yellow cake.

BACKGROUND OF THE INVENTION

"Yellow cake" is a uranium concentrate from ore-processing or leach-liquor processing plants. The processing plants use a variety of processes well known in the art to concentrate the uranium in the ore from conventional mining, or leach-liquor from uranium extraction in leaching processes into a more concentrated product suitable for ultimate purification.

The composition of crude plant yellow cake is dependent upon the type of process employed in concentrating the uranium from the uranium-containing ores. Most yellow cake currently produced in the United States contains mostly either ammonium diuranate or magnesium diuranate. Sodium diuranate is frequently the end-product of carbonate-leach processing plants.

Uranium concentrates (yellow cake) obtained in processing of leach fluids or ore contain usually about 70 to 85 weight percent uranium oxide calculated as $U_3O_8$. The crude yellow cake must be further refined to produce materials actually useful in the energy and chemical industries.

The production of uranium metal and uranium compounds in a high state of purity is becoming increasingly important, particularly in view of the increased usages of nuclear energy to help alleviate the energy shortages being experienced in the more highly developed countries.

The refining of yellow cake generally has employed a dissolution step using nitric acid followed by a solvent extraction step using, for example, tributyl phosphate in hexane to extract uranium from the acidic aqueous phase. Recovery of the extracted uranium from the solvent phase is accomplished by stripping and precipitation.

BRIEF DESCRIPTION OF THE INVENTION

My invention provides a means of obtaining high pure ammonium uranyl tricarbonate or uranium oxides employing a process which is considerably simpler than the prior art processes.

In accordance with my invention, the crude yellow cake is treated with mineral acid in a dissolution step. The resulting acidic admixture then is treated so as to convert the uranium contained therein to ammonium uranyl tricarbonate. The ammonium uranyl tricarbonate then is precipitated with a non-solvent and separated from the liquor. If desired, the ammonium uranyl tricarbonate can be calcined to produce $UO_2$ or $U_3O_8$.

DETAILED DESCRIPTION OF THE INVENTION

Dissolution

In accordance with my invention, crude yellow cake derived from an ore or leach processing plant is treated with mineral acid in a dissolution step.

The inorganic acids known as the mineral acids, such as sulfuric acid, hydrochloric acid, nitric acid, and phosphoric acid, are useful in general for the dissolution of crude plant yellow cake. These acids can be employed in any strength which suitably dissolves the yellow cake. The commercially available concentrated acids can be employed, or the acids diluted with water to strengths of such as about 1 weight percent or more are suitable for use in my invention. It is frequently desirable and helpful to dilute the concentrated acids from 3- to 10-fold before use in dissolving the yellow cake.

The amount of acid employed in the dissolution step is not considered limiting so long as sufficient is employed to substantially dissolve the uranium salts present. It will be recognized by one skilled in the art that it is preferable to avoid large excesses of acid which would have to be neutralized in a succeeding step without benefit, or subsequently need to be recovered or suitably disposed. Sufficient acid generally is employed to provide a final solution containing about 1 to 30 weight percent of dissolved yellow cake. It is currently preferred and convenient to use sufficient acid to provide a solution containing about 5 to 20 weight percent yellow cake.

It is not usually necessary to heat the admixture of yellow cake and acid to effect dissolution, though heating can be employed with or without accompanying changes in pressure as desired. Heat may be evolved depending on the acid or strength thereof employed.

Optional Filtering

Optionally and preferably, the resulting mineral acid admixture is treated for removal of insolubles.

It is recognized that crude plant yellow cake may contain impurities which are not readily soluble in acid. If such proves to be the case, it is within the scope of this invention to provide well-known means, such as filtration, to remove such insoluble impurities and to clarify the solution. Separated solids can be recycled, if desired, to the ore- or leach liquor-processing plant to minimize disposal problems.

Conversion

The acidic solution, preferably filtered, is treated with materials to neutralize the acid substantially and to convert the uranium contained therein to ammonium uranyl tricarbonate.

The conversion of the acidic solution containing uranium to a solution containing ammonium uranyl tricarbonate is accomplished with ammonium uranyl tricarbonate forming materials suitable for the purpose. Conveniently and preferably this is ammonium carbonate. Optionally, ammonium carbamate, carbamic acid, or ammonium bicarbonate can be used, or, depending on the plant location and raw material sources, ammonia or ammonium hydroxide and carbon dioxide can be used. Or, any suitable combination of these materials can be used.

The suitable materials can be added to the uranium containing acidic solution as either solid or aqueous solutions thereof, or in the case of ammonia and carbon dioxide applied as gases. Ammonium carbamate or carbonates are quite convenient, and solutions thereof or slurries thereof containing such as about 5 to 50 weight percent are convenient to handle. The usual precautions in neutralizing strong acids should be employed.

The amount of ammonium uranyl tricarbonate-forming materials to be employed generally will be in the range of about 6 to 50 moles per mole of diuranate salt in the yellow cake, preferably about 10 to 40 moles per mole of diuranate salt.

It is recognized, of course, that the consumption of these ammonium uranyl tricarbonate-forming materials is influenced directly by the amount of excess acid present in the acidic solution. The broad and preferred ranges of material just mentioned are in addition to those required to neutralize excess acidity.

Precipitation

The neutralized solution then is subjected to a precipitation step by admixing a non-solvent of type and amount effective to substantially precipitate the ammonium uranyl tricarbonate.

The non-solvent employed should be one effective to substantially decrease the solubility of ammonium uranyl tricarbonate in the neutralized aqueous solution. At the same time, the non-solvent preferably should be highly soluble in aqueous admixture. For these purposes, the lower alcohols of such as 1 to 4 carbon atoms per molecule, and lower ketones of 3 to 4 carbon atoms per molecule, preferably are employable to precipitate ammonium uranyl tricarbonate from aqueous solution.

Typical lower alcohols useful and employable include methanol, ethanol, isopropanol, n-propanol, t-butanol, and the like. Ketones employable typically are such as acetone or 2-butanone. Mixtures can be employed.

The amount of non-solvent effective as a precipitating agent is not considered to be critical, providing sufficient is employed to effect the desired degree of precipitation of the ammonium uranyl tricarbonate. Broadly, such as about 0.1 to 10 volumes of non-solvent precipitating agent per volume of uranium containing neutralized aqueous solutions are sufficient to precipitate the ammonium uranyl tricarbonate, depending on the non-solvent, and characteristics of the ammonium uranyl tricarbonate. Excess amounts are certainly employable, since the excess is readily separated and recycled. The order of mixing is not critical.

Temperature of the precipitation treatment can be as convenient, such as about 10° C. to 100° C., with the lower temperatures being preferred since therein the ammonium uranyl tricarbonate is less soluble, and problems are not encountered with volatilization of the non-solvent. It should be recognized that the temperature of the solution will depend on the concentration of the mineral acid employed. Generally, more acid means more heat of neutralization. The dissolution solution thus can become hot and require cooling, or it may be cool enough to precipitate without external cooling by such as heat exchangers.

Separation

Separation of the precipitated ammonium uranyl tricarbonate is readily accomplished from the supernatent phase by any suitable means well known in the art, such as by filtration, or centrifugation.

The crude precipitated separated ammonium uranyl tricarbonate preferably is purified, such as by treating by washing, or recrystallization from water, as desired to further purify the product. Subsequent drying of the recovered ammonium uranyl tricarbonate for further use in chemical processes as desired can be at temperatures of such as about 25° C. to 125° C. under an atmosphere of air or inert gas or at reduced pressure.

Calcination

For nuclear energy purposes, normally the purified ammonium uranyl tricarbonate is converted to high purity uranium oxides $UO_2$ or $U_3O_8$.

Ammonium uranyl tricarbonate can be calcined at temperatures in the range of about 350° to about 900° C. to produce uranium oxides, the composition of which depends on the atmosphere employed for the calcination. A reducing atmosphere containing, for example, hydrogen, results in uranium dioxide ($UO_2$); while an oxidizing atmosphere containing, for example, air or oxygen, yields $U_3O_8$.

The high purity uranium oxides prepared by means of my invention can be further used as desired to prepare, for example, fuel elements for nuclear reactors. Any of the well-known conversion processes, isotopic enrichment processes, etc., can be employed utilizing the products of my invention.

Recovery of Non-Solvent

The filtrate from the ammonium uranyl tricarbonate separation step can be subjected to recovery steps such as fractional distillation to recover the non-solvent for recycle to the precipitation step.

The separated aqueous liquor from the separation step sans non-solvent can be further treated for any recovery of traces of uranium containing salts by such as recycling to the mineral acid dissolution step so as to avoid discharge of any uranium containing wastes insofar as possible. Alternatively, such liquor can be recycled back to the crude plant for processing along with the ore or leach liquor.

Effectively, my process is such that highly pure uranium products are obtained without producing uranium-containing wastes.

Example

The Example following should be considered as exemplary, and not limitative. Particular materials employed, relationships, amounts, proportions, species, are designed to be illustrative and of assistance to one skilled in the art and an understanding of my invention, without limiting the reasonable scope thereof.

The following run demonstrates the conversion of crude plant yellow cake to ammonium uranyl tricarbonate and the subsequent calcination of ammonium uranyl tricarbonate to give highly pure $U_3O_8$.

Yellow cake (15 g) containing sodium diuranate (analysis showed 83.4 weight percent uranium oxide calculated as $U_3O_8$) was suspended in water (50 ml). To the suspension was added 26.5 g of sulfuric acid (commercially available concentrated sulfuric acid diluted with an equal volume of water) which resulted in the dissolution of the yellow cake.

After filtration to clarify the turbid solution, the solution was added to an aqueous solution containing 75 g of ammonium carbonate to give a final volume (yellow cake solution plus ammonium carbonate solution) of 1.16 liters. The resultant solution (1 liter) was added with stirring to acetone (500 ml). Immediately, a yellow solid precipitated from the solution.

After filtration, the yellow solid was divided into two approximately equal portions, one of which was washed twice with water and twice with acetone, then dried overnight under vacuum at room temperature, followed by heating at 110° C. for 2 hours. The other portion of the yellow solid was dissolved in water, filtered, reprecipitated twice using acetone, washed with acetone, dried under vacuum at room temperature for 2 hours, and dried 3 hours at 110° C.

Compositions of the two portions of ammonium uranyl tricarbonate are given in Table I:

TABLE I

|  | Washed | Precipitated | Theory for $(NH_4)_4UO_2(CO_3)_3$ |
|---|---|---|---|
| $U_3O_8$, wt. % | 53.9 | 62.2 | 53.8[a] |
| $U_2O_5$, wt. % | 0.06 | 0.02 | 0 |
| Na, wt. % | 0.1 | 0.1 | 0 |
| $NH_4$, wt. % | 13.4 | 10.4 | 13.8 |
| $CO_3$, wt. % | 32.3 | 25.6 | 34.4 |

[a](Theoretical % $UO_2$) × $\frac{\text{(formula wt. of } U_3O_8\text{)}}{3\text{(formula wt. of } UO_2\text{)}}$ It will be observed in Table I that the composition of the washed portion of ammonium uranyl tricarbonate corresponds closely to the theoretical values and that the analysis of the reprecipitated portion deviates somewhat from the theoretical values. The reason for the anomalous results for the reprecipitated portion is not understood, though possible inadvertent sample contamination or inadvertent overheating and partial decomposition in the drying step could have been responsible.

Both samples of ammonium uranyl tricarbonate (washed or reprecipitated) were calcined for 30 minutes at 800° C. in air to give products containing 99.3–99.4 weight percent $U_3O_8$.

The disclosure, including data, illustrates the value and effectiveness of my invention. The example used, as well as the knowledge and background of the field of the invention, general principles of chemistry, and of other applicable sciences, have formed the bases from which the broad descriptions of my invention including the ranges of conditions and operant components have been developed, which, in turn, have formed the bases for my claims here appended.

I claim:

1. A process for the production of high purity uranium salts from crude yellow cake which comprises the steps of:
   (a) dissolving of crude yellow cake with an effective amount of aqueous mineral acid selected from sulfuric, hydrochloric, nitric, and phosphoric acids, thereby forming an aqueous acidic solution containing dissolved uranium,
   (b) adding, to the said acidic solution containing dissolved uranium, sufficient ammonium uranyl tricarbonate-forming components to thereby substantially convert the uranium in said acidic solution to ammonium uranyl tricarbonate, wherein said ammonium uranyl tricarbonate forming materials are selected from ammonia, carbon dioxide, ammonium carbonate, ammonium carbamate, carbamic acid, ammonium bicarbonate, and mixtures of these,
   (c) treating said solution containing ammonium uranyl tricarbonate with a water-soluble organic lower alcohol or ketone in amounts and under conditions effective to precipitate said ammonium uranyl tricarbonate, and
   (d) separating said precipitated ammonium uranyl tricarbonate as a solid ammonium uranyl tricarbonate leaving an aqueous filtrate.

2. The process according to claim 1 including the further step of calcining said ammonium uranyl tricarbonate to produce highly pure uranium oxides.

3. The process according to claim 1 wherein said alcohol or ketone is selected from the group consisting of acetone, 2-butanone, methanol, ethanol, isopropanol, n-propanol, t-butanol, and solution thereof.

4. The process according to claim 1 wherein said effective amount of said alcohol or ketone in said step (c) is in a range of about 0.1 to 10 volumes of alcohol or ketone per volume of uranium containing acidic admixture.

5. The process according to claim 1 further including filtering insolubles from said mineral acid solution from said step (a).

6. The process according to claim 1 wherein in said step (a) said effective amount of said mineral acid is up to about 30 weight percent relative to the amount of crude yellow cake treated.

7. The process according to claim 1 including the further step:
   (e) recovering and recycling said alcohol or ketone from the filtrate from step (d) to said precipitation step (c), leaving a further aqueous filtrate.

8. The process according to claim 7 further including:
   (f) recycling said further aqueous filtrate to step (a).

* * * * *